United States Patent [19]

Duncan et al.

[11] 4,209,490
[45] Jun. 24, 1980

[54] REACTOR COKING SIMULATOR

[75] Inventors: Dennis A. Duncan, Downers Grove; Henry A. Dirksen, Harvey, both of Ill.

[73] Assignee: Institute of Gas Technology, Chicago, Ill.

[21] Appl. No.: 937,090

[22] Filed: Aug. 28, 1978

[51] Int. Cl.² .......................... B01J 1/00; C10G 9/20
[52] U.S. Cl. ..................................... 422/109; 422/119; 422/187; 422/189; 422/199; 422/240; 422/78; 422/130; 196/110; 196/116
[58] Field of Search .............. 422/105, 109, 130, 187, 422/199, 240, 108, 62, 78, 189, 119; 23/230 PC; 219/494, 504, 505; 324/71 R; 196/110, 116

[56] References Cited
U.S. PATENT DOCUMENTS

| | | | |
|---|---|---|---|
| 3,271,116 | 9/1966 | Hazelton | 422/199 |
| 3,318,667 | 5/1967 | Fabuss et al. | 422/78 |
| 3,414,382 | 12/1968 | Kapff et al. | 422/109 X |
| 3,567,388 | 3/1971 | Kapff | 23/230 PC X |
| 3,951,610 | 4/1976 | Freebairn et al. | 422/109 |

OTHER PUBLICATIONS

Perry's Chemical Eng. Handbook; 4th Edition; pp. 25-41 "Resistance Heating."

*Primary Examiner*—Michael S. Marcus
*Attorney, Agent, or Firm*—Thomas W. Speckman

[57] ABSTRACT

A bench scale hydrocarbon reactor simulator accurately simulating full scale reactor coking conditions wherein the rate of coking may be measured by maintaining constant temperature of the reactor simulator exit gas by a temperature responsive circuit varying power supplied to a heater, the increase in power to the heater being proportional to deposition of coke on the heater sheath.

10 Claims, 1 Drawing Figure

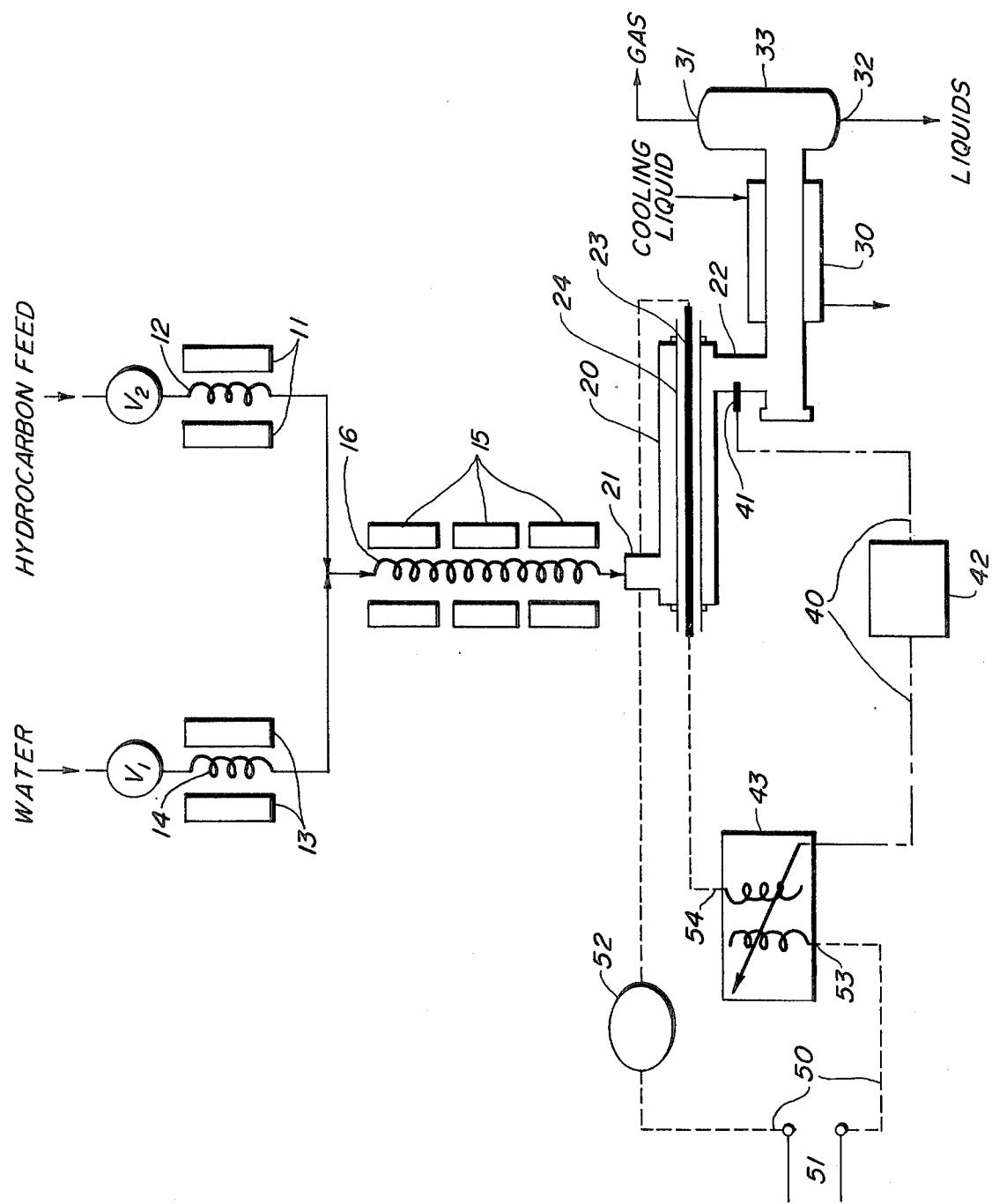

REACTOR COKING SIMULATOR

This invention relates to laboratory bench scale test equipment to simulate coking or fouling occurring in chemical reactors such as are used to crack hydrocarbons, particularly in tubular cracking furnaces.

Hydrocarbon feed stocks ranging from ethane to gas oils are steam cracked or pyrolyzed in tubular cracking reactors to produce ethylene and other petrochemicals. Those reactions are frequently accompanied by side reactions in which carbon is formed and deposited on internal reactor components or on catalyst particles. This is called coking. Coking of the internal tubes of such reactors is undesirable in that it decreases reaction efficiency and results in the need to shut down the reactor periodically to remove the builtup coke deposits. This decoking and the inefficiency of reaction caused by coking makes additional reactor capacity necessary. Additionally, the heat transfer in a tubular cracking reactor decreases significantly with coking on the tube surfaces thereby increasing power requirements. In the case of coking on the catalyst within a reactor, severe deactivation and deterioration of the catalyst results interfering with the reaction and causing plugging of the reactor. In both of these cases it is desirable to detect coking at the very early stages so that process conditions may be adjusted to reduce coking.

In commercial tubular cracking reactors, tubes are about 2 inches to 6 inches in diameter. Coking occurs on the tube coil, particularly towards the hot outlet end of the coil. Two reaction systems occur in commercial pyrolysis; the principal one in the bulk fluid controlled by the general conditions of pyrolysis and particularly, by the tube coil outlet temperature. The other reaction system occurs along the tube wall surface in the boundary layer in which an important reaction influence is the tube metal temperature which can be 200° F. to 300° F. higher than the bulk fluid temperature in modern short residence time reactors. In a short residence time reactor, the tube metal temperature governs the time of reactor operation because it rises as coke is deposited on the wall. The upper limit of temperature for safe reactor operation using tubes of particular metals (Incoloy, HK40) is reached during a period of from 20 to 40 days in an ethylene producing steam cracking furnace.

Variables which affect coking are the pyrolysis conditions of time, temperature, and partial pressure, together with the tube metal temperature and, in the case of a heavy feed stock, some measure of the amount of coke precursor molecules. The type of metal of the tube coil surface also has a bearing, particularly through catalytic effects.

For any given tube coil outlet temperature and reactor loading, the tube metal temperature is a function of the length to diameter ratio of the coil. Small, bench-scale coils which are operated to simulate the pyrolysis conditions of a full size coil bulk fluid reactor do not simulate its coking condition. The tube metal temperature of the bench-scale coil is far too low, being practically the same as the bulk fluid temperature in some designs. When a short and large diameter bench scale coil tube is used to achieve the temperature gradient across the cracked gas film equivalent to a commercial coil, the configuration alters the general pyrolysis conditions. The Reynolds number will be low and additional cracking will take place in the larger-than-usual boundary layer. Thus, the accurate simulating bench-scale apparatus should present a hot metal surface equivalent to a full scale tube metal temperature without interfering seriously with the bulk-fluid pyrolysis conditions. Further, a suitable coking simulator must generate desired data in a relatively short period of time.

The desirability of a bench scale coking simulator which accurately simulates full size reactor conditions is shown by the articles: Leonard, J. J., Gwyn, J. E., and McCullough, G. R., "Pyrolysis Bench Scale Unit Design and Data Correlation," American Chemical Society, ACS Symposium Series 32, Pg. 311, 1976, and Brown, S. M. and Albright, L. F., "Role of the Reactor Surface in Pyrolysis of Light Paraffins and Olefins", American Chemical Society, ACS Symposium Series 32, Pg. 296, 1976.

U.S. Pat. No. 3,318,667 describes test equipment designed to test the high temperature stability of aircraft fuels and measures coke deposits as they appear on a removable grooved plate. The apparatus of the U.S. Pat. No. 3,318,667 patent relies soley on visual measurements and must be completely disassembled each time a reading is made. The apparatus of the U.S. Pat. No. 3,318,667 patent is said to be an improvement over the ASTM-CRC Fuel Coker described in ASTM Method D-1660-61T (Test for Thermal Stability of Aviation Turbine Fuels). U.S. Pat. Nos. 3,567,388 and 3,864,083 describe methods for determining carbon deposition in catalyst beds by monitoring the conductance of a portion of the bed. U.S. Pat. No. 2,984,542 describes a method of determining analytically the level of carbon on a catalyst bed by passing a small quantity of the catalyst particles through a tube with a controlled amount of reactant gas and measuring the differential temperature along the tube.

None of the above described methods provide satisfactory bench-scale simulation of coking, particularly on tubes in commercial hydrocarbon steam cracking reactors.

It is an object of this invention to provide bench scale test equipment suitable for measuring rates of coking in chemical reactors such as are used to crack hydrocarbons.

It is a further object of this invention to provide an apparatus which accurately simulates the coking environment of commercial steam cracking reactors so as to determine coking rate in a full scale tubular cracking reactor.

It is another object of this invention to provide a coking simulator apparatus to measure the rate of coking from hydrocarbon feed stock when steam cracking to produce ethylene at particular severity levels, thus providing a means of setting the optimum severity of cracking, considering both ethylene yield and reactor on-stream time.

It is a further object of this invention to provide a reactor coking simulator which will permit the selection of optimum stream ratios to use with particular hydrocarbon feed stocks.

It is yet another object of this invention to provide a reactor coking simulator for the testing of anti-coking or anti-fouling agents.

It is still another object of this invention to provide a reactor coking simulator for testing the effects of different tubular materials on coking in steam cracking hydrocarbons.

Other objects and advantages of the invention will become apparent from the following description taken in conjunction with the accompanying drawing showing a preferred embodiment wherein:

The FIGURE shows schematically a reactor coking simulator according to this invention.

The reactor coking simulator shown in the FIGURE measures coking and coking rates in the simulation of a full size tubular hydrocarbon steam cracking reactor. Water is added from a supply source through water control valve $V_1$ to water vaporizer coil 14 wherein it is vaporized due to heat from water vaporizer heater 13. Hydrocarbon feed is supplied from a supply source through hydrocarbon control valve $V_2$ to hydrocarbon vaporizer coil 12 and vaporized due to heat from hydrocarbon vaporizer heater 11. The rate of addition of each the water and the hydrocarbon feed may be controlled, measured and recorded according to conventional methods so that the course of reaction is well substantiated. Steam and vaporized hydrocarbon feed are supplied to the initial cracker coil 16 surrounded by initial cracker heaters 15 to obtain desired commencement of cracking of the hydrocarbon feed. The partially cracked hydrocarbon feed and steam are then passed to reactor simulator chamber 20 through entrance 21. Reactor simulator 20 has an outer shell and inner resistance heater sheath 24. Resistor heater sheath 24 is a suitable metal such as stainless steel to simulate the tube in a full scale hydrocarbon cracking reactor. Suitable stainless steels include those having about 20 to 30 weight percent chrome, about 20 to 35 weight percent nickel with the remainder substantially iron, such as HK 40 having 25 weight percent chrome and 20 weight percent nickel and Incoloy 800 having 20 weight percent chrome and 30–35 weight percent nickel, both commercially available from International Nickel Company. Heater sheath 24 is preferably easily removable and replaceable to permit easy exchange for testing various metals. The vaporized hydrocarbon feed and water enter reactor simulator 20 at one end through entrance 21 pass through the reactor simulator surrounding resistance heater sheath 24 and exit at the opposite end through reactor simulator exit 22. The vapors from reactor simulator 20 pass to cooler 30 which may be a water quench or other cooling device supplied with a cooling liquid. The vapors then pass to gas-liquid separator 33 having liquid outlet 32 and gas outlet 31. Both the gas and liquids may be analyzed as desired and discarded from the system.

Temperatures on the surface of resistance heater sheath 24 simulate those of the tubes in commercial cracking reactors. This simulation is achieved by heat supplied from resistance heater, such as a silicon-carbide glo-bar, and its control by the electric circuitry shown. Power is supplied by power supply 51 to power circuit 50 shown as evenly dashed lines. Power circuit 50 passes through variable transformer 43 having power supply 51 on transformer input 53 side of the transformer and transformer output 54 side of variable transformer 43 in series with resistance heater 23. Also in series with resistance heater 23 is power circuit watt meter or recorder 52. Variable transformer 43 is controlled by control circuit 40 having temperature sensor 41, such as a thermister, measuring the gas temperature at reactor simulator exit 22. This is the same as the coil outlet temperature of a commercial tube cracking reactor. Temperature sensor 41 is in series with temperature responsive circuit 42 which is any suitable control powering variable transformer 43 in desired response to the signal from temperature sensor 41. In this fashion, the coil outlet temperature at the reactor simulator exit 22 may be maintained substantially constant. During cracking, coking occurs on resistance heater sheath 24 decreasing the heat transfer, thus lowering the coil outlet temperature sensed by temperature sensor 41 which in turn increases the power output of variable transformer 43 to resistance heater 23 to maintain the coil outlet temperature. Watt meter 52 measures the increased power to resistance heater 23 required to maintain constant coil outlet temperature and therefore is a direct measurement of coking occurring on resistance heater sheath 24.

It is seen that the reactor simulator of this invention basically is a reactor simulator chamber having a process stream entrance and exit and enclosing an instream, tubular sheathed electric resistance heater, said heater supplied by a power circuit controlled by a temperature sensor in the reactor simulator exit gas stream to maintain substantially constant temperature of the reactor simulator exit gas by a temperature responsive circuit varying power supplied to said heater, and a watt meter in series with said heater wherein an increase in power of the power circuit is proportional to the deposition of coke on said heater sheath. The additional apparatus in communication with the reactor simulator chamber entrance and exit may be modified in any manner desired to pretreat the reactants and to modify or measure the exit gases as desired. For example, cooler 30 may generally trap coke loosened and moved from the heater sheath. The gas stream exit may also be in communication with a $CO_x$ analyzing means, such as a gas chromatograph, to measure coking in the system.

The reactor coking simulator shown in the FIGURE, provides true simulated reactor conditions by adjusting the heat of the tube upon which coking is taking place to simulate the hot wall conditions in a full scale reactor by adding heat to maintain a constant coil outlet temperature as carbon builds up on the wall. The increased power required is directly related to the amount of coking on the hot tube and thus, reactor conditions of variance of hydrocarbon and water feeds, reactor temperatures, reactor flow rates, materials of reactor construction and anti-coking or anti-fouling agent effectiveness may be determined on a bench scale unit. Anti-coking and anti-fouling agents may cause transposition of formed coke from the zone of formation to a downstream zone. The apparatus shown in the FIGURE provides the ability to follow this phenomenon by trapping the formed carbon in the cooler or separator for measurement of movement or release from the cracking zone while measurement of $CO_x$ generated may also be measured downstream from the cracking zone as a measure of coking.

The apparatus of this invention may be constructed from suitable materials known to the art for temperature, pressure and chemical corrosion conditions existent with the desired chemical system to be simulated. Conventional electronic and electric components may be used in the control circuit and in the power circuit to achieve the desired conditions as explained above.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A hydrocarbon reactor coking simulator comprising: a reactor means comprising a tubular reactor chamber having a gas inlet means at one end and a gas outlet means at the opposite end providing gas flow through said tubular reactor chamber, an in-stream, electric resistance heater means having an annular tubular sheath within said reactor chamber and in said gaseous flow, power circuit means in electrical communication with said heater means and electric power supply means, said power circuit means supplying variable power to said heater means and comprising temperature sensor means in said gas outlet means in series with a temperature responsive circuit means controlling a variable transformer means varying power to said heater means to maintain substantially constant temperature of said gaseous flow at said gas outlet means, and a measurement means in series with said heater means, for indicating an increase in power supplied to said heater means which is proportional to the deposition of coke on said heater sheath.

2. The reactor simulator of claim 1 wherein said heater sheath is made of stainless steel.

3. The reactor simulator of claim 1 wherein said heater is made of silicon-carbide.

4. The reactor simulator of claim 1 wherein said heater sheath is made of stainless steel having about 20 to 30 weight percent chrome, about 20 to 35 weight percent nickel with the remainder substantially iron.

5. The reactor simulator of claim 1 wherein said gas inlet means is in fluid conduit communication with an initial cracker means providing commencement of cracking the hydrocarbon feed.

6. The reactor simulator of claim 5 wherein said initial cracker means inlet is in fluid communication with a hydrocarbon vaporizer means and a water vaporizer means.

7. The reactor simulator of claim 6 having measurement means for measuring the water and hydrocarbon feed to said vaporizer means.

8. The reactor simulator of claim 1 wherein said gas outlet means is in fluid communication with a cooler means.

9. The reactor simulator of claim 8 wherein said cooler is in fluid communication with a gas-liquid separator having a separate gas and liquid outlet.

10. The reactor simulator of claim 9 wherein a $CO_x$ analyzing means is in communication with said gas outlet.

* * * * *